United States Patent [19]

Scoville et al.

[11] 3,967,661
[45] July 6, 1976

[54] INSULATION SLITTING AND WIRE WRAPPING TOOL

[75] Inventors: Ray R. Scoville, La Canada; Harold F. Tipton, Burbank, both of Calif.

[73] Assignee: Vector Electronic Company, Sylmar, Calif.

[22] Filed: Sept. 17, 1975

[21] Appl. No.: 614,098

[52] U.S. Cl. ............................. 140/124; 242/7.17
[51] Int. Cl.² ..................... B21F 15/00; B25F 1/00; H02G 1/12
[58] Field of Search .................. 7/14.1 R; 29/203 B, 29/203 D, 203 H; 81/9.5 R; 140/115, 118, 119, 122, 124; 242/7.06, 7.17, 7.18

[56] References Cited
UNITED STATES PATENTS

| | | | |
|---|---|---|---|
| 2,682,063 | 6/1954 | Miloche | 242/7.06 |
| 2,759,166 | 8/1956 | Mallina | 29/505 X |
| 3,213,894 | 10/1965 | Etchison et al. | 242/7.17 |
| 3,554,243 | 1/1971 | DeRose et al. | 140/124 |
| 3,619,829 | 11/1971 | Finn et al. | 7/14.1 R |
| 3,625,262 | 12/1971 | Baker et al. | 242/7.17 |
| 3,628,402 | 12/1971 | Staiger | 140/124 |
| 3,781,932 | 1/1974 | Baker et al. | 140/124 |
| 3,803,649 | 4/1974 | Skutt et al. | 140/124 |
| 3,882,906 | 5/1975 | Steiner et al. | 140/124 |
| 3,903,935 | 9/1975 | Boothby | 140/124 |

*Primary Examiner*—Milton S. Mehr
*Assistant Examiner*—E. M. Combs
*Attorney, Agent, or Firm*—Pollock, VandeSande & Priddy

[57] ABSTRACT

A rotatable wire wrap tool of the type having an apertured tip end operative to engage a terminal to wrap the terminal with wire as the tool is rotated, is provided with a bobbin carrying a supply of insulated conductor wire which is fed from the bobbin through the tool to its tip end. The interior of the tool is provided with a slitting element positioned to engage the surface of the wire as it is fed toward its wrapping position, to cut an elongated continuous slot through any insulation on the wire while leaving the remainder of the insulation intact, and the tool is further provided with an inclined face adjacent its tip end for guiding and twisting the slotted wire as the tool is rotated to bring the portion of the conductor wire which is exposed through the slot in the insulation into electrical contact with the terminal being wrapped.

19 Claims, 12 Drawing Figures

INSULATION SLITTING AND WIRE WRAPPING TOOL

BACKGROUND OF THE INVENTION

The present invention is concerned with an improved wire wrap tool capable of use either manually or in conjunction with an appropriate power drive, and operative to provide one or more wraps of wire about a terminal which is engaged by the tool to form an electrical connection to the terminal.

The basic principles of wire wrap tools have long been known in the art and are discussed, for example, in Mallina U.S. Pat. No. 2,759,166, issued Aug. 14, 1956, for "Wrapped Electrical Connection". Over the years, a wide variety of such tools, ranging from simple hand-held and hand-rotatable tools to computer controlled completely automatic high speed machines, have been developed and used in the industry. The Mallina tool contemplated that the wire being wrapped might have an enamel or insulating coating thereon, and relied on forces between the wire and the terminal being wrapped to crush the insulation at a number of spaced points along the wire to achieve a metal-to-metal contact between the conductor wire itself and the terminal being wrapped. This crushing technique, however, is not reliable to achieve the desired electrical contact in all cases, and the Mallina approach in this particular respect was therefore discarded, in subsequent developments, in favor of alternative approaches wherein the wire being wrapped had no insulation at all thereon, or wherein, if an insulated wire was to be wrapped, a length of the wire was completely stripped of all insulation either in a separate preliminary operation or by an appropriate insulation stripper included in the tool.

Prior patents which disclosed wire wrap tools adapted to wrap either bare wire, or wire which has been prepared by complete removal of a length of insulation therefrom before being supplied to the tool, include Ackerman U.S. Pat. Nos. 3,788,367 and 3,670,784, Baker et al U.S. Pat. No. 3,625,262, Hannify U.S. Pat. No. 3,618,641, Lamoureux U.S. Pat. No. 3,318,344, Olds et al U.S. Pat. No. 3,078,052, Zoltai U.S. Pat. No. 3,250,302, Emberson et al U.S. Pat. No. 3,066,879, Miklau U.S. Pat. No. 2,785,797, and Beaulieu et al U.S. Pat. No. 2,648,356. In general, tools of this type require that the wire to be wrapped first be cut to proper length and stripped for about an inch or so at each end. One stripped end is then threaded into a slot at the end of the tool whereafter the tool and wire is placed over a post or terminal to be wrapped and the tool is rotated, either by the user's fingers or by a small motor, to wrap the wire tightly around the post or terminal. This procedure is comparatively slow and tedious.

In an effort to expedite the operation somewhat by eliminating the need to prestrip the wire before it is threaded into the wrapping tool, tools have been suggested which include means therein for completely stripping a length of insulation from the wire end being wrapped as the wire is being fed from an appropriate supply on or associated with the wrapping tool. Arrangements of this type are disclosed in Skutt et al U.S. Pat. No. 3,803,649, Baker et al U.S. Pat. No. 3,781,932, Staiger U.S. Pat. No. 3,628,402, Finn et al U.S. Pat. No. 3,619,829, deRose et al U.S. Pat. No. 3,554,243, Zoltai U.S. Pat. No. 3,394,742, Finn U.S. Pat. No. 3,393,715, Wood el al U.S. Pat. No. 3,378,048, Belek et al U.S. Pat. No. 2,807,810, and Miloche U.S. Pat. No. 2,682,063. Tools of this latter type are, in general, somewhat more complex than those intended to wrap bare or prestripped wire. Moreover all such tools have the major disadvantage that the wire wraps are completely devoid of insulation.

In this latter respect, even with the low voltages (3.6 volts for RTL logic to 18 volts for CMOS) used in modern electronics applications, it is far more advantageous to provide wrap connections which have insulation thereon, so that the outer periphery of the wrapped wires remains insulated to reduce the possibility of short circuits to densely packed neighboring posts and wires. The complete stripping of the insulation from the wire being wrapped, either before it is fed through the wrapping tool or at the time it is being so fed, makes it impossible to achieve this important advantage.

In contrast, and as will be discussed more fully hereinafter, the present invention provides a tool which supplies insulated wire from a spool directly to wrap-posts without the need for prestripping and/or precutting the wire. The tool does not remove insulation from the wire in the usual sense, but merely slots the insulation to expose a portion of the underlying conductive wire while leaving the remaining insulation intact. A 20 to 35% reduction in the number of connections required can be achieved, and all points which are to be electrically interconnected in a circuit can be serviced with one continuous strand of wire in "daisy chain" fashion. More than one level is rarely required, with the result that the wrap posts can be significantly shorter (about half the usual length) and with the further result that less space between stacked wiring cards is needed, i.e., there can be a 40 to 60% decrease in inter-board spacing. Since the wrap connection on each post or terminal is fully insulated from adjacent terminals, terminals can be placed closer together without danger of accidental shorting, thereby accomplishing a further degree of compactness in design while simultaneously achieving increased reliability. Moreover, in a normal wire wrap assembly the wires are often pulled tight at the corners against the sharp edges of the extending terminals with the result that vibration and heat may cause short circuits to occur; but with a single-connection height terminal wrapped with insulated wire, as is achieved by the present invention, this potential problem is also avoided.

SUMMARY OF THE INVENTION

The present invention comprises a novel wire wrap tool which is operative to effectively wrap thinly insulated plastic-coated wire without need to prestrip or precut the wire. The wire is pulled off a bobbin attached to the tool and, as it is fed through the tool during the wire wrapping operation, is pulled past a knife edge within the tool which operates to cut or "plow" a narrow slit extending longitudinally along the plastic insulation of the wire. As the tool is rotated during the wrapping operation, the wire is caused to twist slightly to bring the surface of the copper wire which is exposed through the slit insulation against the sharp corner of the post being wrapped, and as the wire rolls along the sharp corner of the post the slit is further opened, exposing the conductor itself to the post corner, and indenting both the wire conductor and post to produce a "gas-tight" joint at each wrap position. This twisting operation is effected, in a preferred embodiment of the invention, by forcing the wire to climb an inclined planar ramp on the face of the tool, or by guiding the wire toward the post along a helical ramp on the face of the tool; but such ramps can be dispensed with, in other embodiments of the invention. The parted insulation produced by the slitting operation comes to rest in the space between the turns of the wire where it does not interfere with the joint or clog the system. In this way, high conductivity joints, having virtually the same conductivity as those produced when bare copper wire is used, are obtained between the copper wire and the wrap post corners, but the wire wraps are otherwise fully insulated on their exterior surfaces to achieve the various advantages described above.

The foregoing slitting and twisting operations are in contrast to prior art techniques wherein insulation is completely removed from the wire being wrapped. The slitting operation which characterizes the present invention is accomplished by feeding the wire through an interior channel or slot in the wire wrap tool, and by then angularly displacing the wire at a location adjacent the aforementioned knife edge so that the wire passes through a constricted auxiliary channel or slot which extends at an angle to the axis of the tool and which functions to force the wire against the cutting edge as it is fed toward the wrap position. Since the slitting operation is achieved by reason of the angular displacement of the wire within the tool in a particular direction, the insulation is not cut if the wire is pulled straight out of the tool, or if it is pulled out of the tool on the side thereof opposite the cutting or knife edge; and, as a result, the tool may be moved continuously from one post to another without producing any damage to the insulation in the extended length of wire which go from post to post.

In use, the wire is wrapped on a first terminal or post, and its starting end is cut off at a position close to the connection. All other points to be connected to this terminal are then wired in succession in "daisy chain" fashion by moving the tool from one post to another. The wire may then be cut and a new series of connections made, but the more efficient method of operation is to go immediately to the next set of terminals without cutting the wire, and thereafter to the next set of terminals to be wired, etc. After all connections have been wrapped by the single continuous length of wire, excess interconnections are simply removed by a hand-held wire clipper. Each wrapped connection is fully insulated on its exterior but is nevertheless in good electrical contact with the terminal at the interface between the wire wraps and terminal edges. The lengths of wire which extend from one terminal to the next are fully insulated on their exteriors, but some caution is needed to avoid pulling these intervening lengths of wire tight across sharp corners of nonconnected posts since, while the insulation of the wire will withstand considerable abrasion at normal temperatures, there is some danger that it may cold flow at elevated temperatures sufficiently to make undesired connections when pressure is also present. To avoid this, plastic wiring spacers can be used to hold intervening lengths of wire away from tight contact with the nonconnected posts and such wire spacers also dress up the wiring, and improve its appearance and stability. If care is taken, however, in running the length of wire to assure that the wires are not pulled tight across metal corners in the overall assembly, the wiring spacers may be omitted.

BRIEF DESCRIPTION OF THE DRAWINGS

The foregoing construction, operation, and advantages of the present invention will become more readily apparent from the following description and accompanying drawings in which.

DESCRIPTION OF THE PREFERRED EMBODIMENTS

Figure 1:
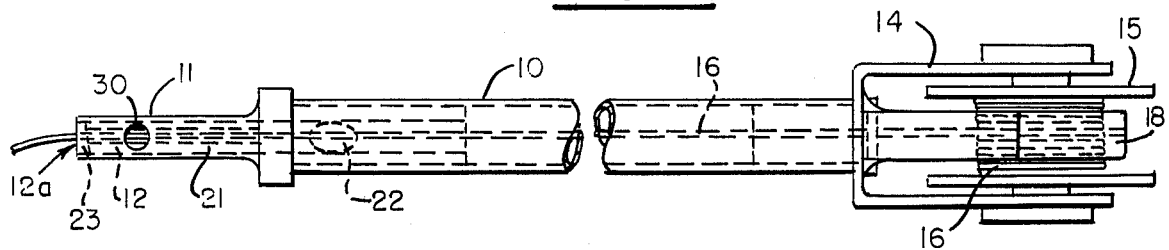
FIG. 1 is a top view of a wiring tool constructed in accordance with the present invention.
Figure 2:
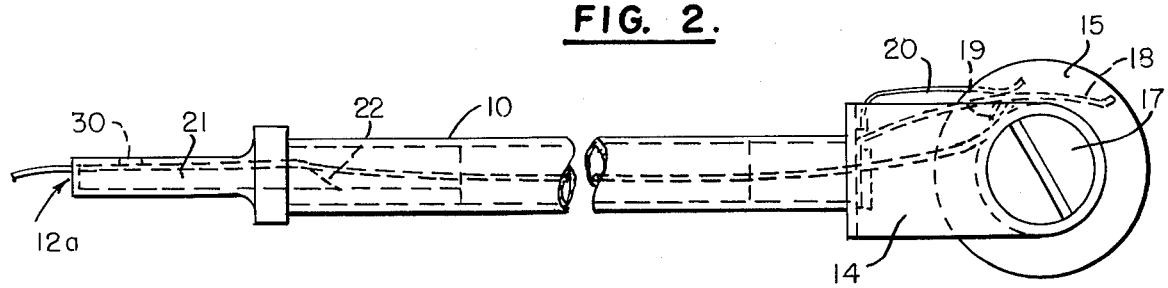
FIG. 2 is a side view of the tool shown in FIG. 1.

As best shown in FIGS. 1 and 2, the wire wrap tool of the present invention comprises an elongated cylindrical tubular member 10 having a tip end 11 which defines a central axial bore 12a which communicates with a smaller central bore 12 in an interior element 21 (to be described) for the reception of a terminal 13 to be wrapped. The other end of the tool carries a removable bracket 14 which supports a bobbin 15 carrying a supply of insulated wire 16 thereon, the bobbin itself beind retained in place by a screw 17 which extends between the flanges of bracket 14 and which provide a shaft upon which bobbin 15 can rotate. Bracket 14 includes a buffer structure comprising an arcuate metallic member 18 having a resilient layer 19, e.g., foam plastic, adhesively secured to its under surface in facing relation to the coil of wire 16 on bobbin 15, and a leaf spring 20 bears resiliently on the upper surface of member 18 to urge said member and material 19 into engagement with the wire coil to prevent the wire from unwinding too fast thereby to minimize the possibility of wire snarls within the tool.

Wire 16 may be either bare wire or insulated wire, and it may be of any of various different gauges provided, however, that various interior portions of the tool intended to cooperate with the wire are appropriately dimensioned in accordance with the principles to be discussed hereinafter. In the commercial embodiment of the invention the wire 16 comprises No. 28 gauge copper wire (0.0126 inch diameter), and an insulating coating of polyurethane and an outer layer of nylon are extruded around the copper to increase the diameter of the overall wire by approximately one to two mils over that of the copper wire itself. The various dimensions which will be given hereinafter have reference to the use of such wire, or its equivalent, in the tool, but it will be understood that wire 16 may have other gauges and/or other types of insulation thereon without departing from the basic principles of the present invention.

Tip end 11 of the tool comprises a tubular element having a smaller interior diameter than that of tubular member 10 and is affixed to the end of member 10, opposite to bobbin 15, in any appropriate fashion, e.g., by a force fit telescopic junction. Tip end 11 has a generally cylindrical steel element 21 (see especially FIGS. 3 through 6) inserted therein in press fit relation to the interior of tubular tip end 11, and the opposing ends and intervening surface portions of said insert 21 are specially shaped to perform various wire guiding and insulation stripping functions.

More particularly, insert element 21 has a diameter of substantially 0.1065 inches, is provided with an inclined face 22 at one end thereof which is oriented at substantially 25° to 35° to the axis of the element, has an inclined face 23 at its opposite end which is oriented at substantially 75° to the axis of the element, defines the aforementioned central bore 12 extending partially along the axis of said element and opening into inclined face 23, and defines an elongated substantially rectangular slot 24 which extends along the exterior of the element between the opposing inclined faces 22, 23 in radially spaced relation to central bore 12. Element 21 is inserted into the tip end 11 of the tool with inclined face 22 facing the interior of the tool. The inclination of face 22 functions to direct the length of wire, extending from bobbin 15 along the central axis of tubular member 10, in a radial direction outward of said central axis and into elongated slot 24, and slot 24 cooperates with the interior surface of tubular tip portion 11 to define an elongated interior channel which directs the wire toward the face 23 end of the insert in radially spaced relation to its central axis.

Figure 4:
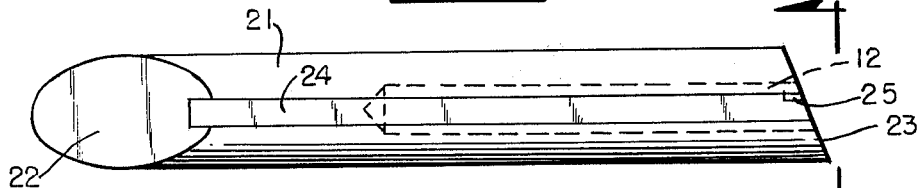
FIG. 4 is a bottom view of the interior element shown in FIG. 3.
Figure 4A:
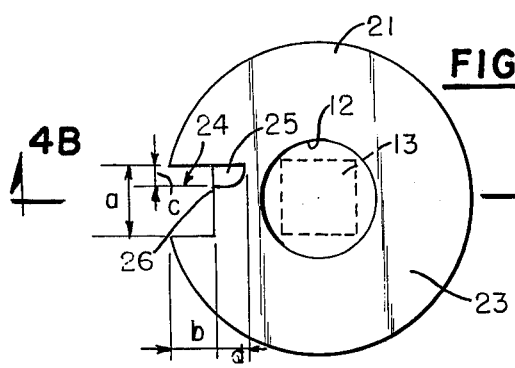
FIG. 4A is an end view of the interior element, taken on line 4A—4A of FIG. 4.
Figure 4B:
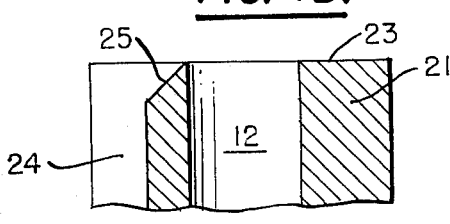
FIG. 4B is a cross section taken on line 4B—4B of FIG. 4A.
Figure 5:
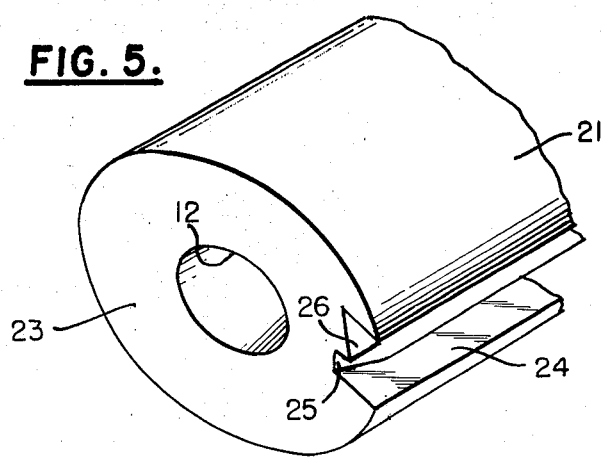
FIG. 5 is a perspective view of one end of the interior element shown in FIGS. 3 and 4.
Figure 6:
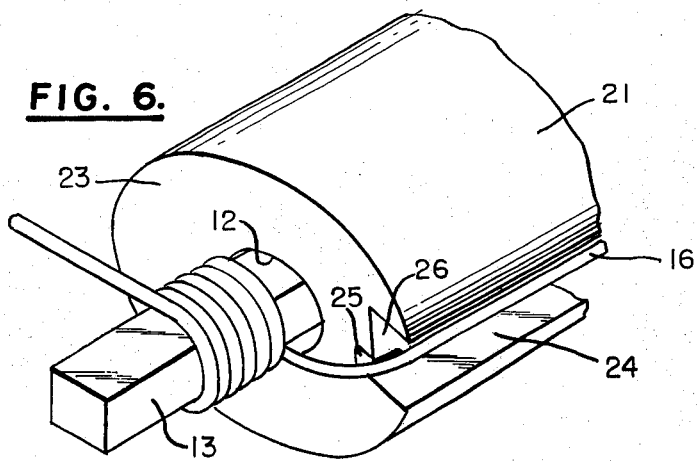
FIG. 6 is a view similar to that of FIG. 5 showing how said interior element cooperates with a length of wire and a wrap post or terminal.
Figure 7:
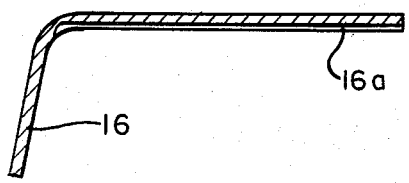
FIG. 7 is a detail view illustrating the length of wire having its insulation slit by the tool of the present invention.

The end of slot 24 adjacent inclined end 23 thereof, is provided with a smaller slot 25 having a special shape which enables it to perform the insulating slitting function discussed earlier. Slot 25 extends at an angle of substantially 45° to the axis of the insert 21 (see especially FIG. 4B and FIG. 5) between inclined face 23 and the forwardmost end of elongated slot 24, and defines a sharp point 26 at intersection between slots 24 and 25 which is positioned to engage the surface of a length of wire passing through slot 24 as the wire bends out of the axial direction defined by slot 24 into slot 25 (see FIG. 6). The back and bottom side of slot 25 is curved to pass the round wire through said slot 25 with minimum disturbance while point 26 slits the insulation thereon, in a fashion similar to a plow going through soft earth, to form a furrow or kerf 16a therein (see FIGS. 7 and 8). Slot 25 is dimensioned to permit the wire 16 to pass therethrough in the fashion described, but preferably has a width slightly smaller than that of the diameter of wire 16 to provide an interference to the passage of the wire therethrough which causes sufficient pressure to assure that point 26 will cut through any insulation on wire 16. These dimensional relationships are illustrated in FIG. 4A. Slot 24 has a width $a$ of substantially 0.030 – 0.034 inches and a depth $b$ of 0.018 – 0.020 inches, whereas slot 25 has a width $c$ of substantially 0.011 – 0.013 inches and a depth $d$ of substantially 0.011 – 0.014 inches. The diameter of axial bore 12 is approximately 0.040 inches for the reception of 0.025 inch square wire wrap posts 13, and said bore 12 extends into element 12 for a depth of substantially 0.56 – 0.59 inches.

Figure 8:
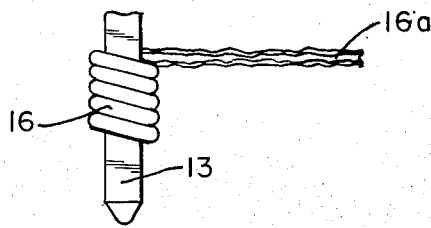
FIG. 8 is a view of a length of wire, similar to that shown in FIG. 7 associated with a wrap post or terminal.

The wire, with its insulation slit, emerging from slot 25 passes onto inclined face 23 at the outermost end of insert 21 and is directed along that face at a tangent to the opening of bore 12 along one side of a wrap post 13 located in bore 12. As the tool and said insert 21 are rotated, the wire is twisted about its longitudinal axis so that the furrow 16a is brought into facing relation to the corners of the square post 13 and wrapped about those post corners with the portion of the copper wire exposed through said slit being in electrical contact with post 13. The angle of inclination of face 23 determines the extent to which the wire twists, and an appropriate relationship must accordingly be observed between the angle of face 23 and the location of slitting point 26 to assure that the furrow in the wire insulation is brought into facing relation to post 13 at the time the wire is wrapped about said post. In accordance with one embodiment of the invention, the point 26 is located to cut a furrow or slot in the wire insulation along a line disposed at an angle of about 50° to 60° from the bottom of the wire in channel 24, and the wire is thereafter caused to twist (in a counterclockwise direction as viewed in FIG. 6) through an additional 30° to 40° before reaching the first corner of wrap post 13 to produce an overall rotation of substantially 90° in the wire resulting in proper facing of kerf 16a to the post corner. The additional 30° – 40° twist is caused by the combined action of the 75° ramp provided by inclined face 23 and the rolling action of the wire as it engages the first corner of wrap post 13, and said rolling action indents both the wire and the corner of the post which it engages to achieve a high conductivity joint therebetween. As the wire continues to be wrapped about the post, it slides along the other corners of the post and is thereby further indented at said other corners. The resultant configuration is shown in FIG. 8, which depicts a wire which has been wrapped about a post and subsequently partially unwrapped to illustrate the indentations which are produced in the exposed copper as it passes over the corners of the post 13 in correct facing relation thereto.

The twist which occurs in the wire 16 as it approaches post 13 will be more readily appreciated if the post 13 is visualized as a "rack" which moves away from the inclined ramp provided by face 23 and which, as it does so, turns the incoming wire much as a rack would turn a pinion. The resulting rolling action, in addition to properly positioning the slot or furrow in the insulation relative to the corners of post 13, further lays open the slender furrow in the insulation and causes the displaced insulation to come to rest in the space between adjacent turns of wire on the post. The displaced insulation does not therefore require removal, does not interfere with the electrical connections, does not clog the system, and, indeed, produces a "gas-tight" joint about the post which is completely covered by the insulation on or from wire 16 except in those regions where the exposed copper is in firm mechanical and electrical engagement with the post 13.

Figure 3:
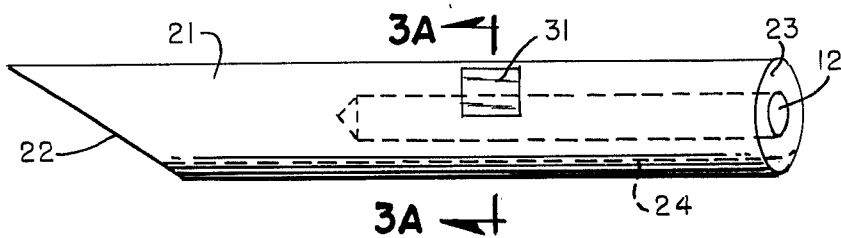
FIG. 3 is a side view of an interior element of the tool of the present invention.
Figure 3A:
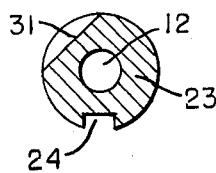
FIG. 3A is a cross section taken on line 3A—3A of FIG. 3.

The tool is used in the fashion described earlier to provide wrap connections to one or more posts, individually or in any desired sequence, by simply slipping the tip end of the tool over a post to be wrapped (e.g., the terminal post of an electrical component), and by then rotating the entire tool with the fingers until a desired number of turns have been effected, whereafter the tool is removed from post, moved to the next post in the wiring sequence, and the same sequence of operations are followed. The wire is cut, at the end of a given wiring operation, with a palm-held clipper which is separately carried with the wrap tool but, if desired, an appropriate wire clipper can be incorporated into the tool itself for this purpose. Upon occasion, the wire may be cut short at the tip end of the tool, and to avoid difficulties the tip end 11 is preferably provided with a hole 30 (see FIGS 1 and 2) which is disposed in facing relation to elongated slot 24 so that a pin or sharp pointed tool inserted into hole 30 can be used to push a length of wire 16 in slot or channel 24 forward to a sufficient extent that it can be grasped manually. In order to assure proper alignment between the hole 30 and slot 24, insert 21 can be provided with one or more flat faces 31 (see FIGS. 3 and 3A) acting as crimping pads onto which an adjacent portion of tip end 11 can be crimped to prevent any rotation of insert 21 relative to tip end 11. Such inclined pads 31 can moreover, be used for mounting insert 21 within tip end 11 by an analogous crimping operation, thereby simplifying the manufacture of the overall device.

Figure 9:
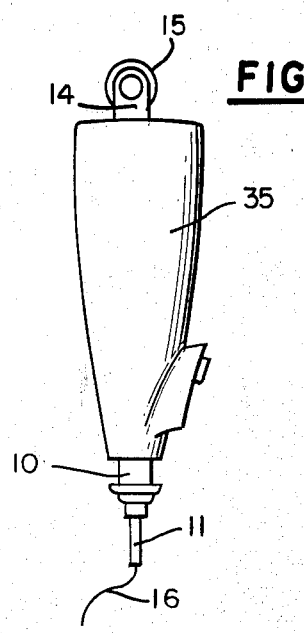
FIG. 9 depicts a motor-driven wire wrap apparatus employing the tool of the present invention.

In order to make the wire wrapping operation even easier, the tool shown in FIGS. 1 and 2 may, if desired, be associated with a rechargeable cordless power unit 35 (see FIG. 9) comprising a chuck adapted to receive the wire wrap tool and associated with an internal battery operated motor which rotates said chuck upon depression of a finger actuatable switch carried by the unit. Such units are in themselves, commercially available, e.g., the model P 160-4 power wrap tool sold by Vector Electronic Company, Sylmar, Cal.

The wrap tool of the present invention can be used to wrap lugs or terminals having sizes larger than can be inserted in the central bore 12, 12a of the tool, and can also be used to wrap round wires or terminals of any size. These latter operations are accomplished by simply rotating the entire tool around a tab or component wire to be wrapped while drawing the connecting wire from the tool. Such connections will, however, require soldering since sufficient tightness cannot be obtained by such technique. Soldering is easily accomplished when a hot iron and solder is applied to the junction i.e., the plastic insulation on the wire quickly melts away to allow good connections of the junctions. This alternative technique is especially useful when a variety of terminal sizes are present on the equipment, and makes it possible to wire consecutively a wide variety of different terminal sizes and configurations without changing the tools employed.

While we have thus described preferred embodiments of the present invention, many variations will be apparent to those skilled in the art. For example, instead of providing a planar ramp such as 23, the desired twisting operation can be achieved by providing a helical ramp in the outer face of insert 21 (which, for example, would climb from left to right, as viewed in FIG. 6, and then drop off abruptly at the end of the 360° turn) or, in some embodiments of the invention, by using no ramp at all and relying on the tendency of the wire to wedge itself up as the tool is rotated. Moreover, rather than providing the slitting element at the intersection of slots 24 and 25, as described, a slitting edge can be provided at any appropriate alternative location, e.g. in or along slot 24 before the wire is bent into slot 25, or in slot 25 or inclined face 23 to slit the wire after it has made its bend toward or onto said face 23. It must therefore be understood that the foregoing description is intended to be illustrative only and not limitative of the present invention, and all such variations and modifications as are in accord with the principles described are meant to fall within the scope of the appended claims.

Having thus described our invention, we claim:

1. A wire wrap tool for wrapping insulated conductor wire on a terminal, comprising an elongated tubular member having a tip end which defines a central axial bore for the reception of a terminal to be wrapped, said central bore opening into an outermost face of said tip end which face is disposed nonorthogonal to the axis of said tubular member, a supply of insulated conductor wire mounted on said tubular member in longitudinally spaced relation to said tip end of said member, an elongated first interior channel within said tubular member extending in a direction generally parallel to and radially displaced from the axis of said tubular member for guiding a length of said insulated conductor wire from said supply to said tip end of said member, a second comparativey short interior channel extending at an angle to the axis of said member from said first channel to said outermost face of said tip end at a position on said face radially spaced from the opening of said central axial bore, and slitting means within said tubular member for cutting a longitudinal slot in the insulation of said wire along a line angularly displaced from the bottom of the wire in said first channel as said wire passes from said first channel into said second channel and toward said outermost face, the inclination of said nonorthogonal outermost face being operative to twist said wire as it passes from said second channel toward said bore to position the longitudinal slot in said insulation in facing relation to a terminal in said central bore thereby to bring the portion of said conductor wire which is exposed through said slot into electrical contact with the terminal.

2. The tool of claim 1 wherein said slitting means is disposed adjacent the junction of said first and second channels.

3. The tool of claim 2 wherein the width of said second interior channel is less than the width of said first interior channel, the lesser width of said second channel being operative to force said wire against said slitting means as said wire passes from said first channel into said second channel.

4. The tool of claim 1 wherein said second channel extends at an angle of substantially 45° to the axis of said member.

5. The tool of claim 1 wherein said nonorthogonal outermost face is planar.

6. The tool of claim 5 wherein said slitting means is positioned to cut said slot in said insulation along a line displaced at an angle of 50° to 60° from the bottom of the wire in said first channel, said planar outermost face being oriented at an angle of substantially 75° to the axis of said member.

7. The tool of claim 1 wherein the side wall of said elongated tubular member includes an aperture opening into said first interior channel at a location longitudinally spaced from said tip end, to permit a length of wire in said first channel to be pushed manually toward said tip end.

8. The tool of claim 1 wherein said supply of insulated wire comprises a bobbin removably attached to the end of said elongated tubular member opposite to said tip end.

9. The tool of claim 8 wherein said bobbin includes resilient means for controlling the unwinding of the wire from said bobbin.

10. The tool of claim 8 wherein wire is fed from said bobbin into and along the axis of said elongated tubular member, said member including an inclined interior surface for directing wire from the axis of said member toward and into said first interior channel.

11. The tool of claim 10 including an elongated body inserted into said tubular member at its tip end, said outermost face constituting first face at one end of said elongated body, said inclined interior surface constituting an inclined second face at the other end of said elongated body, said first interior channel comprising a first groove extending from said other end of said body along the exterior surface of said body toward said one end of said body, and said second interior channel comprising a further groove in the exterior surface of said body communicating with said first groove and extending at an angle to said first groove adjacent said one end of said body.

12. The tool of claim 11 wherein said slitting means includes a tooth-like projection integral with said body adjacent the junction of said two grooves.

13. The tool of claim 11 wherein said first groove has a substantially rectangular cross-section, said second groove being at least partially curved in cross section.

14. The tool of claim 11 wherein the width of said first groove is greater than the width of said second groove.

15. In a rotatable wire wrap tool of the type operative to feed a length of wire toward a tip end of the tool which tip end is arranged to engage an elongated terminal to wrap said terminal with said wire as said tool is rotated, the improvement wherein said tool is provided with interior slitting means for engagement with the surface of the wire as the wire is fed toward said tip end to cut an elongated continuous slot through any insulation on said wire while leaving the remainder of said insulation intact, and guide means in said tool between said slitting means and the portion of said tip end which engages the terminal being wrapped for guiding said slotted wire toward said terminal in a direction transverse to the direction of elongation of said terminal to bring said slot into facing relation to an outer surface of said terminal.

16. The improvement of claim 15 wherein said guide means includes means for twisting said slotted wire as said tool is rotated.

17. The improvement of claim 16 including means within said tool for forcing said wire into engagement with said slitting means as said length of wire is fed toward the tip end of said tool.

18. The improvement of claim 16 wherein said tool includes means for feeding said wire toward said slitting means along a path substantially parallel to the axis of rotation of said tool, said means for twisting said slotted wire comprising an inclined surface disposed transverse to the axis of rotation of said tool and oriented in a direction nonorthogonal to said axis of rotation.

19. The improvement of claim 18 wherein said tip end of said tool includes a recess extending along the axis of rotation of said tool for receiving the terminal to be wrapped, one end of said recess opening into said inclined surface at a position radially displaced from said slitting means.

* * * * *